United States Patent
Tsai

(10) Patent No.: US 6,942,073 B1
(45) Date of Patent: Sep. 13, 2005

(54) ON/OFF DAMPER FOR BIKES

(76) Inventor: Chin-Sung Tsai, No. 2, Lane 371, Hwa Cheng Rd., Hsin Chuang City, Taipei Hsien (TW)

( * ) Notice: Subject to any disclaimer, the term of this patent is extended or adjusted under 35 U.S.C. 154(b) by 13 days.

(21) Appl. No.: 10/783,016

(22) Filed: Feb. 23, 2004

(51) Int. Cl.⁷ .............................................. B62K 25/06
(52) U.S. Cl. ...................... 188/300; 267/120; 280/276; 188/322.19
(58) Field of Search ........................... 188/300, 322.19; 267/33, 34, 64.12, 120; 280/275, 276

(56) References Cited

U.S. PATENT DOCUMENTS

| | | | | |
|---|---|---|---|---|
| 3,843,107 A | * | 10/1974 | Atkins | 267/64.15 |
| 4,620,620 A | * | 11/1986 | Johnston et al. | 188/266.4 |
| 5,449,189 A | * | 9/1995 | Chen | 280/276 |
| 6,102,354 A | * | 8/2000 | Thorn | 248/406.2 |
| 6,308,940 B1 | * | 10/2001 | Anderson | 267/125 |
| 6,592,136 B2 | * | 7/2003 | Becker et al. | 280/276 |
| 6,802,407 B1 | * | 10/2004 | Chen | 188/319.2 |

\* cited by examiner

Primary Examiner—Christopher P. Schwartz
(74) Attorney, Agent, or Firm—Bacon & Thomas PLLC

(57) ABSTRACT

An activation device for a damper includes a stopping tube adapted to be securely received in the piston rod and having grooves defined in a peripheral edge of the stopping tube and first teeth formed on the peripheral edge of the stopping tube, a driving tube adapted to be movably received in the piston rod and in the stopping tube and having second teeth formed on a peripheral edge of the driving tube and a rotating tube adapted to be movably received in the piston rod and having third teeth engaged with the second teeth so that the movement of the driving tube is able to drive the rotating tube to rotate an angle to selectively allow a corresponding one of the third teeth to be received in the grooves such that communication between the axial passage and the space is selectively plugged.

14 Claims, 4 Drawing Sheets

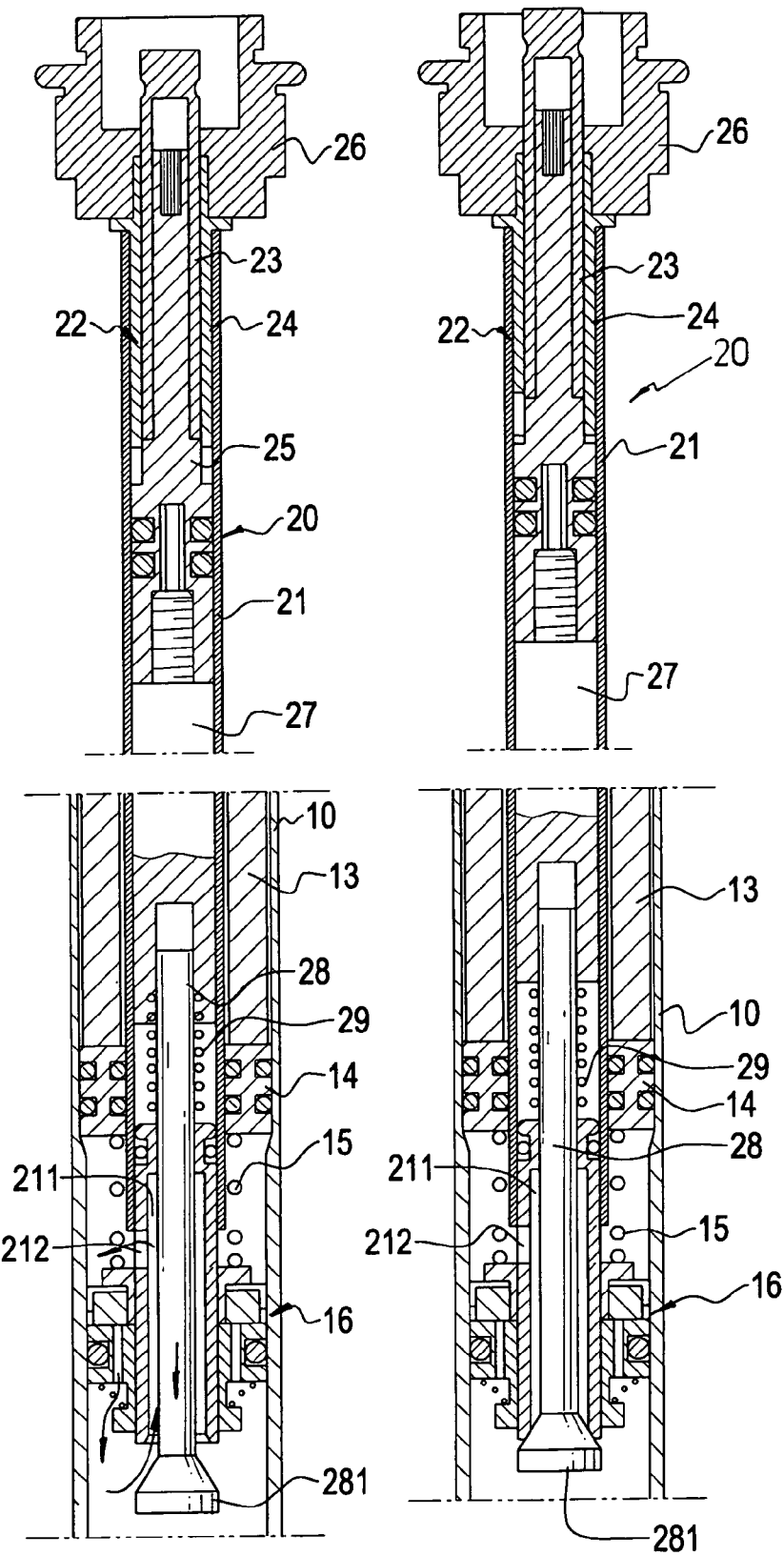

ON/OFF DAMPER FOR BIKES

BACKGROUND OF THE INVENTION

1. Field of the Invention

The present invention relates to a damper, and more particularly to a damper which is able to be deactivated and activated according to the road conditions.

2. Description of Related Art

Conventional bike dampers constantly provide damping effect to the bumpy road conditions such that the rider is able to enjoy the fun of riding. When the rider is riding across the country or passing a mountainous area, the rider requires large damping effect to damp the impact from the roads. When the rider is passing a metropolitan area where the roads are nicely paved, the rider generally does not require that much damping effect. However, the same damping effect will be provided to the rider despite the road conditions are changed. Therefore, the rider may find that whenever a brake is applied, the rider together with the bike will vibrate due to inertia. Some may find it amusing but it does affect the rider's enjoyment.

To overcome the shortcomings, the present invention tends to provide an improved damper to mitigate the aforementioned problems.

SUMMARY OF THE INVENTION

The primary objective of the present invention is to provide an improved damper which is able to be shut off to adapt to paved roads.

Another objective of the present invention is to provide an indicator on top of the damper to indicate that the damping function is deactivated so that the rider is able to learn the status of the damper.

Other objects, advantages and novel features of the invention will become more apparent from the following detailed description when taken in conjunction with the accompanying drawings.

BRIEF DESCRIPTION OF THE DRAWINGS

FIG. 4 is a schematic cross sectional view showing that the activation rod is activated to allow the fluid in the damper to flow into piston tube;

FIG. 6 is a schematic cross sectional view showing that the activation rod is activated to stop the fluid in the damper flowing into the piston tube.

DETAILED DESCRIPTION OF THE PREFERRED EMBODIMENT

Figure 1:
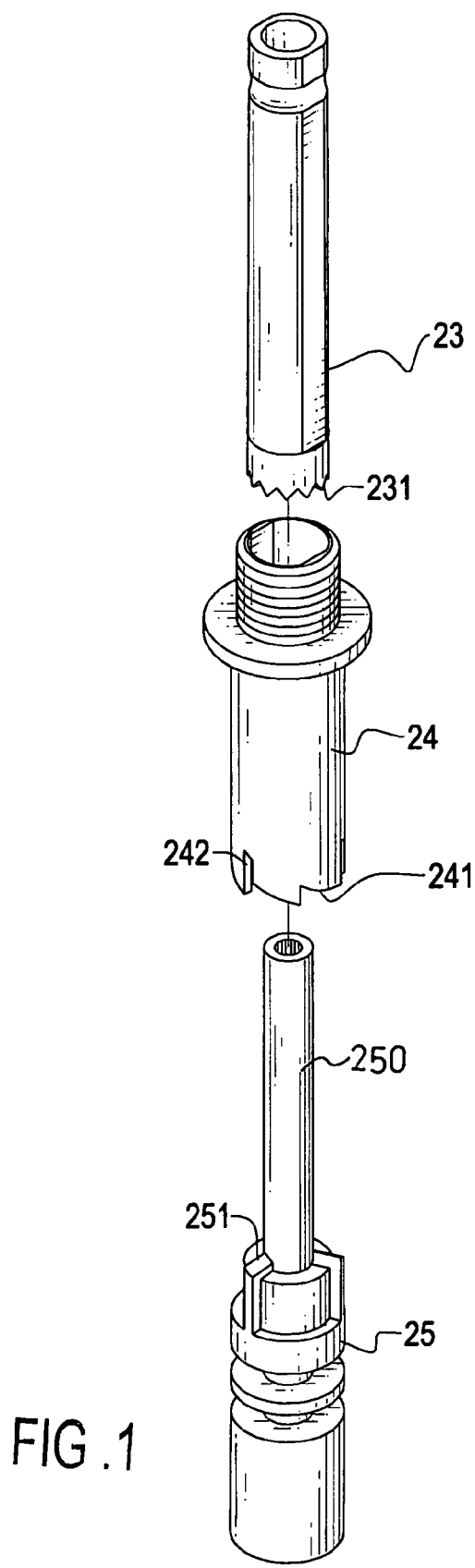
FIG. 1 is an exploded perspective view of the activation device in the damper of the present invention.
Figure 2:
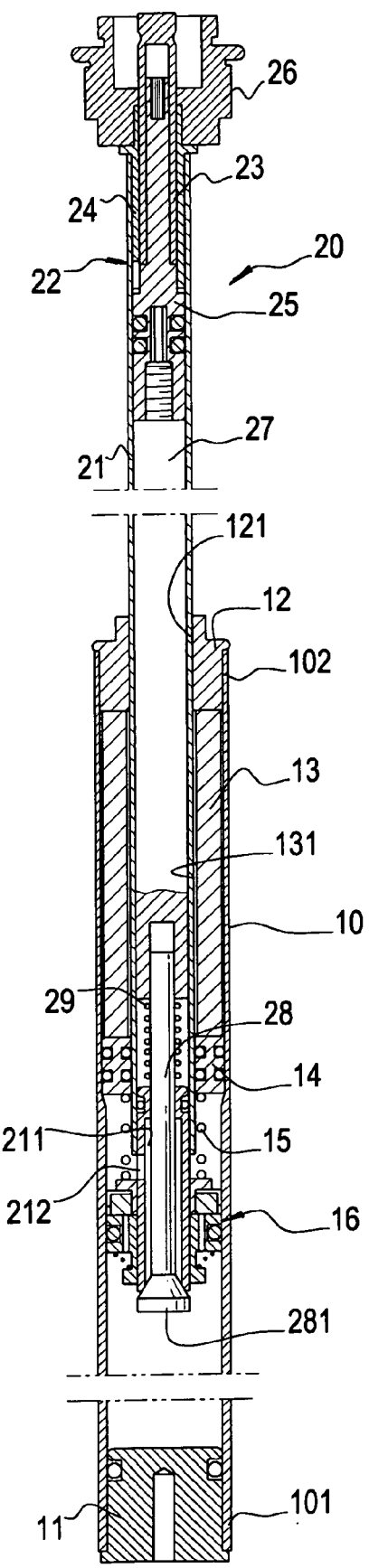
FIG. 2 is a schematic cross sectional view showing the inner structure of the damper of the present invention.

With reference to FIG. 1 and FIG. 2, an activation device (22) in accordance with the present invention includes an driving tube (23), a stopping tube (24) and a rotating tube (25).

The driving tube (23) has small slanted teeth (231) formed on a peripheral edge of the driving tube (23). The stopping tube (24) has a configuration so defined that after the driving tube (23) is received in the stopping tube (24), there is no relative rotation between the driving tube (23) and the stopping tube (24). The stopping tube (24) has large slanted teeth (241) formed on a peripheral edge of the stopping tube (24) and having a dimension larger than a dimension of the small slanted teeth (231) and locking grooves (242) formed on the peripheral edge of the stopping tube (24) and having at least one large slanted teeth (241) sandwiched between two adjacent locking grooves (242). The rotating tube (25) has a hollow extension (250) extending upward and into the driving tube (23) and wedge-shaped teeth (251) formed on a shoulder (not labeled) of the rotating tube (25) to correspond to the smaller slanted teeth (231).

With reference to FIG. 2, it is noted that the activation device (22) of the present invention is assembled with a piston rod assembly (20), a cylinder (10) and a piston assembly (16).

The cylinder (10) is hollow inside and has a first end (101) fitted with a first plug (11) in the first end (101) and a second end (102) fitted with a second plug (12) having a first through hole (121) defined through the second plug (12). A resilient block (13) having a second through hole (131) corresponding to and aligned with the first through hole (121) is placed inside the cylinder (10) adjacent to the second plug (12) and a piston ring (14) is also received in the cylinder (10).

The piston rod assembly (20) extends through the first through hole (121) of the second plug (12), the second through hole (131) of the resilient block (13) and the piston ring (14) to connect to the piston assembly (16). Because the detailed structure and function of the piston assembly (16) are well known in the art as well as the connection with the piston rod assembly (20), detailed description thereof is thus omitted for brevity. A spring (15) is provided facing the piston assembly (16).

The piston rod assembly (20) includes a piston rod (21) with an axial passage (211) defined through the piston rod (21) and a fluid hole (212) on top of the piston assembly (16) and in communication with the axial passage (211), a linkage (27) received in the axial passage (211) to be operably connected to the activation device (22), a switching plug (28) connected to the linkage (27) to be movably received in the axial passage (211) and having a conical head (281) formed on a free end of the switching plug (28) and extending out of the axial passage (211) so as to control the communication between inside and outside of the axial passage (211) of the piston rod (21), a recoil spring (29) sandwiched between the linkage (27) and the switching plug (28) and mounted around the switching plug (28) to provide a recoil force to the linkage (27). A seat (26) is mounted on top of the stopping tube (24) after the driving tube (23) is received in the stopping tube (24) to prevent separation of the driving tube (23) from the stopping tube (24).

Figure 3:
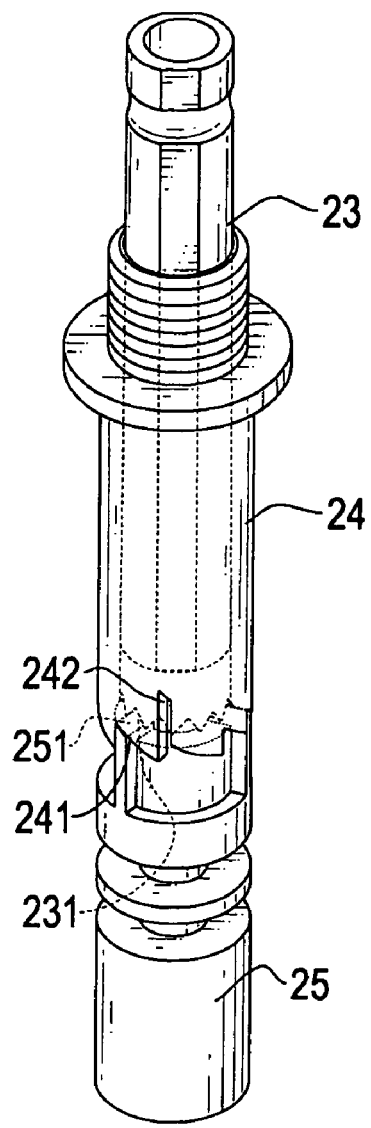
FIG. 3 is a schematic perspective view showing the engagement of the activation device to allow the activation rod to move toward the piston tube to open the piston tube.

With reference to FIGS. 3 and 4, it is noted that when the driving tube (23) is pressed, the small slanted teeth (231) drives the large slanted teeth (251) and thus the rotating tube (25) is rotated a predetermined angle to enable the large slanted teeth (241) to be seated on top of the wedge shaped teeth (251). Because the dimension of the large slanted teeth (241) is larger than that of the small slanted teeth (231), the rotating tube (25) together with the driving tube (23) is thus forced by the large slanted teeth (241) to move toward the piston assembly (16). When the rotating tube (25) is moved toward the piston assembly (16), the linkage (27) and the switching plug (28) in connection with the linkage (27) are also moved in a direction the same as that of the rotating tube (25). Therefore, the conical head (281) leaves and opens the axial passage (211) to allow the fluid in the piston assembly (16) to flow into the axial passage (211) and a space between the piston assembly (16) and the piston ring (14) from the fluid hole (212). Because the space between the piston assembly (16) and the piston ring (14) is fixed so that when the fluid in the piston assembly (16) flows into the space, damping effect is provided to damp out the impact from the bumpy road surface.

Figure 5:
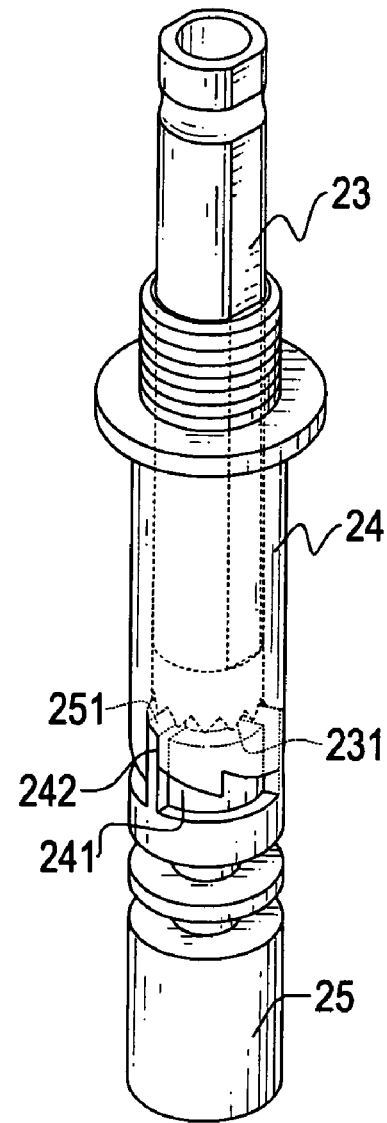
FIG. 5 is a schematic perspective view showing the engagement of the activation device to allow the activation rod to move away from the piston tube to plug the piston tube.

With reference to FIGS. 5 and 6, when the driving tube (23) is pressed again, the small slanted teeth (231) drives the wedge shaped teeth (251) and thus the rotating tube (25) rotates a predetermined angle to enable a corresponding one of the wedge shaped teeth (251) to be received in the locking groove (242). Because the locking groove (242) has a depth larger than a pitch of the large slanted teeth (241), a recoil force stored by the recoil spring (29) from the previous operation where the switching plug (28) is forced to move in the axial passage (211) to allow the conical head (281) to open the communication between the inside and outside of the piston rod (21) forces the linkage (27) as well as the switching plug (28) to move away from the piston assembly (16) and thus the opening of the axial passage (211) is plugged by the conical head (281). Therefore, when the driver is riding a bicycle on a paved and smooth road, the rider is able to shut the function of the activation device (22) to enjoy the ride. However, the rider is able to rotate the driving tube (23) to activate the damping effect of the piston assembly (16) as required.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An activation device for a damper having a piston assembly and a piston rod assembly provided with a piston rod which has an axial passage defined in the piston rod and a fluid hole defined in a side face of the piston rod to communicate the axial passage with a space outside the piston rod, the activation device comprising:
   a stopping tube adapted to be securely received in the piston rod and having grooves defined in a peripheral edge of the stopping tube and first teeth formed on the peripheral edge of the stopping tube;
   a driving tube adapted to be movably received in the piston rod and in the stopping tube and having second teeth formed on a peripheral edge of the driving tube; and
   a rotating tube adapted to be movably received in the piston rod and having third teeth engaged with the second teeth so that the movement of the driving tube is able to drive the rotating tube so that it rotates at an angle to selectively allow a corresponding one of the third teeth to be received in the grooves of the stopping tube such that communication between the axial passage and the space is selectively plugged.

2. The activation device as claimed in claim 1, wherein a switching plug is provided to be operably connected to the rotating tube and receivable in the axial passage such that when the rotating tube is moved due to the movement of the driving tube, the switching plug selectively plugs the axial passage.

3. The activation device as claimed in claim 2, wherein the switching plug has a conical head formed on a free end of the switching plug so as to plug the axial passage.

4. The activation device as claimed in claim 1, wherein the first teeth has a dimension larger than a dimension of the second teeth.

5. The activation device as claimed in claim 3, wherein the first teeth has a dimension larger than a dimension of the second teeth.

6. The activation device as claimed in claim 4, wherein at least one first tooth is sandwiched between two adjacent grooves of the stopping tube.

7. The activation device as claimed in claim 5, wherein at least one first tooth is sandwiched between two adjacent grooves of the stopping tube.

8. The activation device as claimed in claim 1 further comprising a recoil spring mounted under the rotating tube to provide a recoil force to the rotating tube.

9. The activation device as claimed in claim 2 further comprising a recoil spring mounted under the rotating tube to provide a recoil force to the rotating tube.

10. The activation device as claimed in claim 3 further comprising a recoil spring mounted under the rotating tube to provide a recoil force to the rotating tube.

11. The activation device as claimed in claim 4 further comprising a recoil spring mounted under the rotating tube to provide a recoil force to the rotating tube.

12. The activation device as claimed in claim 5 further comprising a recoil spring mounted under the rotating tube to provide a recoil force to the rotating tube.

13. The activation device as claimed in claim 6 further comprising a recoil spring mounted under the rotating tube to provide a recoil force to the rotating tube.

14. The activation device as claimed in claim 7 further comprising a recoil spring mounted under the rotating tube to provide a recoil force to the rotating tube.

* * * * *